US007896933B2

(12) United States Patent  (10) Patent No.: US 7,896,933 B2
Sato et al.  (45) Date of Patent: Mar. 1, 2011

(54) HYDROGEN SUPPLYING APPARATUS AND METHOD OF MANUFACTURING HYDROGEN SUPPLYING APPARATUS

(75) Inventors: Akihiro Sato, Hitachinaka (JP); Takao Ishikawa, Hitachi (JP); Kinya Aota, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 846 days.

(21) Appl. No.: 11/401,923

(22) Filed: Apr. 12, 2006

(65) Prior Publication Data
US 2006/0231588 A1 Oct. 19, 2006

(30) Foreign Application Priority Data
Apr. 15, 2005 (JP) ................................ 2005-117677

(51) Int. Cl.
*B01J 7/00* (2006.01)
*H01M 8/06* (2006.01)
*C01B 3/36* (2006.01)
*C01B 6/24* (2006.01)
*C10J 3/46* (2006.01)
*C10J 3/54* (2006.01)
*B23K 20/12* (2006.01)
*B23K 37/00* (2006.01)
*B23K 31/02* (2006.01)

(52) U.S. Cl. ......... 48/61; 48/197 R; 423/644; 423/648.1; 228/2.1; 228/2.3; 228/112.1

(58) Field of Classification Search ........ 48/61; 228/2.1, 228/2.3, 112.1, 114.5
See application file for complete search history.

(56) References Cited

U.S. PATENT DOCUMENTS
5,645,626 A    7/1997  Edlund et al.
2001/0039759 A1  11/2001  Sato et al.
2003/0172589 A1*  9/2003  Krueger .................... 48/127.9

FOREIGN PATENT DOCUMENTS
DE    101 23 410 A1    5/2002
JP    2003-010658      1/2003
JP    2004-008966      1/2004
JP    2005028378 A  *  2/2005
WO    WO 03/076062 A2  9/2003
WO    WO 2004/037418 A2  5/2004

OTHER PUBLICATIONS

JPO Machine Translation of JP 2005-028378 A (translated Apr. 21, 2009).*
German Official Action for Application No. DE10 2006 017 046.6, dated Apr. 13, 2007.

* cited by examiner

*Primary Examiner* — Alexa D Neckel
*Assistant Examiner* — Matthew J Merkling
(74) *Attorney, Agent, or Firm* — Antonelli, Terry, Stout & Kraus, LLP.

(57) ABSTRACT

A hydrogen supplying apparatus equipped with a hydrogen separation membrane and a catalyst plate, which is made by forming a catalyst layer on a metal plate, wherein the metal material of the membrane is different in hardness from that of the catalyst plate.

A method of producing the hydrogen supplying apparatus, which comprises: bonding a catalyst plate and a hydrogen separation membrane to each other, by friction-stir welding, wherein a welding tool is pressed towards only one of the membrane and catalyst plate, forming a reaction layer between the membrane and the catalyst plate by the frictional heat, and forming ripples in the welded interface.

16 Claims, 9 Drawing Sheets

HYDROGEN SUPPLYING APPARATUS AND METHOD OF MANUFACTURING HYDROGEN SUPPLYING APPARATUS

CLAIM OF PRIORITY

This application claims priority from Japanese application serial No. 2005-117677, filed on Apr. 15, 2005, the content of which is hereby incorporated by reference into this application.

BACKGROUND OF THE INVENTION

1. Field of Technology

The present invention relates to a hydrogen supplying apparatus which supplies hydrogen to automobiles or localized power supplies such as home fuel cells and more specifically, to a hydrogen supplying apparatus which has a hydrogen separation membrane and a manufacturing method thereof.

2. Background of Art

There have been investigated a various types of reactors wherein a raw gas is introduced into a reactor to effect reaction so as to obtain a desired gas and the resulting gas is guided into a gas channel through a membrane which passes only the desired gas, the membrane being disposed between reactor and the gas channel. (See Patent Documents 1 and 2.)

Patent Document 1: Japanese Application Patent Laid-Open Publication No. 2003-10658

Patent Document 2: Japanese Application Patent Laid-Open Publication No. 2004-8966

City gas reformers, which are one type of reactors or hydrogen supplying apparatuses, which generate hydrogen from organic hydrides by dehydrogenation use a hydrogen separation membrane so as to lower the reaction temperature and supply hydrogen with high purity. The hydrogen separation membrane is a metal foil, which contains Pd, Nb, or Zr as a main component. Conventionally, the membrane has been formed on a ceramic base or the like.

SUMMARY OF THE INVENTION

In order to increase the efficiency in hydrogen separation, it is preferable that the hydrogen separation membrane is provided between the reaction section and the gas channel.

An object of this invention is to provide a hydrogen supplying apparatus using a hydrogen separation membrane to keep a catalyst active with no problems mentioned above and to provide a method of manufacturing the same.

A structure of the hydrogen supplying apparatus according to one aspect of this invention is characterized by a hydrogen supplying apparatus comprising a hydrogen separation membrane and a catalyst plate made by forming a catalyst layer on a metal plate, wherein the catalyst plate and the hydrogen separation membrane are welded together by a friction stir welding (FSW). Or a structure of this invention to solve the above problems is characterized by a hydrogen supplying apparatus comprising a hydrogen separation membrane and a catalyst plate made by forming a catalyst layer on a metal plate, wherein the catalyst plate and the hydrogen separation membrane are welded at a welding interface with ripples

DETAILED DESCRIPTION OF THE PREFERRED EMBODIMENTS (An Apparatus Structure of this Invention)

Below will be explained a hydrogen supplying apparatus according to an embodiment of this invention.

The hydrogen supplying apparatus according to the embodiment of this invention basically comprises a plurality of reactors each comprising a metallic substrate, a catalyst layer, a hydrogen separation membrane, and a hydrogen channel forming layer. The hydrogen supplying apparatus is further equipped with a casing and a hydrogen outlet pipe, etc. The metallic substrate can have hydrogen source material channels through which the hydrogen source material flows. The cannels may be formed on one or both surfaces of the substrate. It is possible to use a combination of a catalyst plate with a metal plate (substrate) on which the catalyst layer is formed.

More than one hydrogen supplying apparatuses are mounted side-by-side on a tubular or sheet-like support to produce a hydrogen supplying module.

In this invention, the hydrogen separation membrane is preferably welded to the substrate by a friction-stir welding.

If such membranes are welded at high temperature, the nature of the catalyst may be deteriorated by heat and the catalyst may lower its activity. In brazing such membranes the brazed parts may be embrittled or may narrow the hydrogen or hydrogen source material channel by the brazing material.

It is possible to produce a hydrogen supplying reactor without using a channel forming plate by forming a catalyst layer on the hydrogen separation membrane or applying a catalyst function to the hydrogen separation membrane. By combining the catalyst layer and the hydrogen separation membrane in this way, hydrogen can be taken out from both surfaces of the hydrogen source material channels. This can increase the efficiency in supplying hydrogen.

(Reactor of FIG. 1)

Figure 1A:
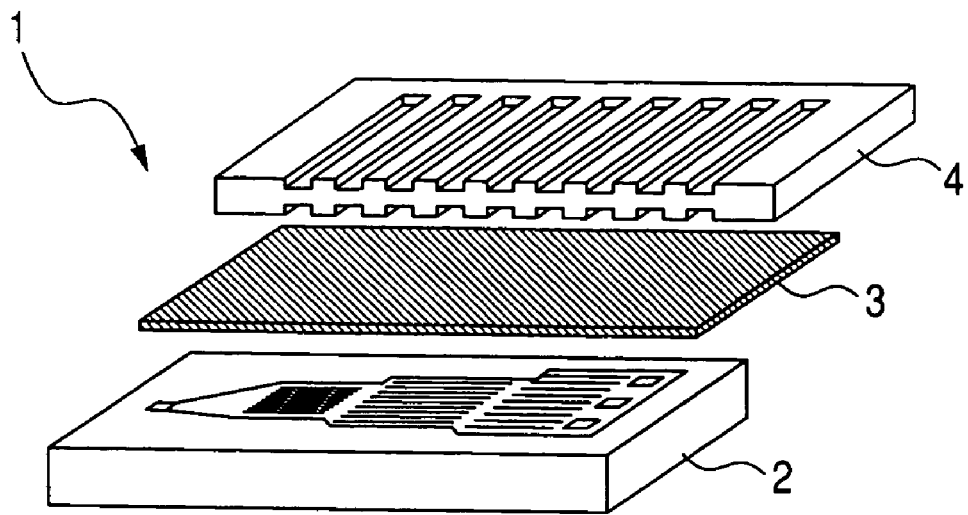
FIG. 1(a) shows an exploded view of a hydrogen supplying reactor.
Figure 1B:
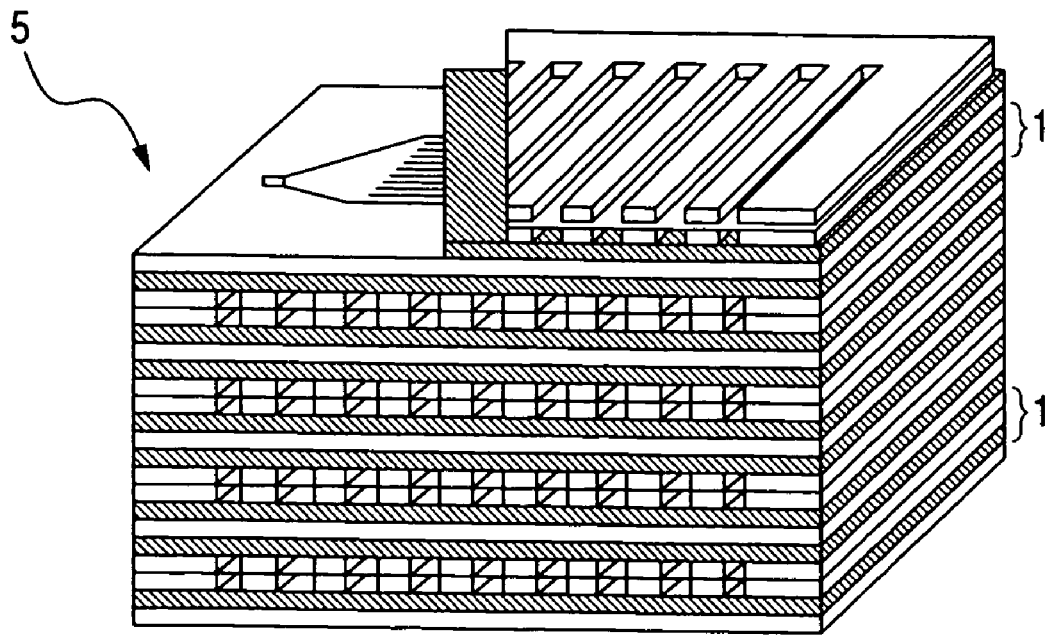
FIG. 1(b) shows a perspective view of a hydrogen supplying stack.

FIG. 1 shows structures of a hydrogen supplying apparatus, which uses a hydrogen separation membrane. FIG. 1(a) shows an exploded view of a hydrogen supplying reactor which is a basic unit of the hydrogen supplying apparatus. FIG. 1(b) shows a perspective view of a hydrogen supplying stack which is a stack of the hydrogen supplying reactors.

Hydrogen supplying reactor 1 comprises spacer 4, hydrogen separation membrane 3, and catalyst plate 2, which has a catalyst layer on the surface of a metallic substrate. Hydrogen supplying stack 5 is assembled by stacking and bonding the reactors 1. Further, the hydrogen supplying stacks 5 are stacked into a hydrogen supplying module (which is not shown in the drawing) when they are applied to automobiles or localized power supplies.

Catalyst plate 2 has, on its surface, hydrogen source material channels formed by machining or etching, for flowing hydrogen source therethrough. Each channel has a catalyst layer on its surface so that hydrogen source material takes place chemical reaction in contacting with the catalyst to produce hydrogen when it passes through the channels.

Spacer 4 in the reactor is a flow passage layer for hydrogen in case where the reactor is used as a hydrogen supplying apparatus, and if space 4 is used as a means for storing hydrogen, it works as a hydrogen supplying port. Each spacer has grooves in the substrate or through-holes perpendicular to the substrate and at least one surface of the spacer is provided closely to the hydrogen separation membrane.

In FIG. 1, the hydrogen source material channels are perpendicular to hydrogen channels.
(Reactor of FIG. 6)

Figure 6:
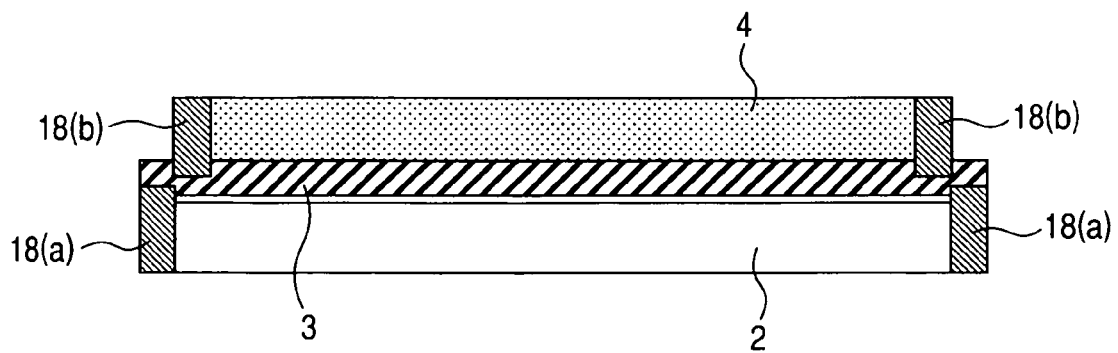
FIG. 6 shows a sectional view of a welded hydrogen supplying apparatus in the third embodiment.

More than one hydrogen supplying reactors of this invention can be assembled into a hydrogen supplying stack. As shown in FIG. 6, it is preferable to sandwich a catalyst plate between two hydrogen separation membranes of different sizes. Further, it is preferable that the hydrogen separation membrane over the catalyst plate is different in the welding position from the hydrogen separation membrane under the catalyst plate. This enables deviation of a friction stir welding (FSW) position and production of a multi-layer hydrogen supplying apparatus.
(FSW of This Invention)

Next will be explained a method of welding members. A predetermined friction stir welding (FSW) is optimum to production of hydrogen supplying apparatus of this invention.

A friction stir welding (FSW) method takes the steps of piling two or more members, pushing a welding tool which is harder than the members against the outermost member while rotating the tool, causing the tool and the member to have a frictional heat, and welding the members by a resulting plasticized material flow phenomenon (Japanese Application Patent Laid-Open Announcement No. Hei 07-505090). This welding method unlike an arc welding method does not weld members to be welded. Further, this welding method is different from a conventional rotating friction-compressing method which rotates members to be welded and welds them each other by the resulting frictional heat. Further, this friction stir welding (FSW) method can weld members continuously along the weld line or longitudinally. A conventional lap-jointing method by the friction stir welding (FSW) technique is represented by a method which uses a welding tool whose end surface is flat or dent (Japanese Application Patent Laid-Open Publication No. 2001-314981). The members welded by this method characteristically have a periodic ripple pattern on the welded surfaces as shown FIG. 2(b). The ripple interval depends upon the rotational speed and moving speed of the welding tool (10).

However, this conventional method has not been available to welding of membranes like hydrogen supplying reactors of this invention because the membranes are apt to be deformed during welding and further because the hydrogen supplying reactor of this invention is a lamination of different materials of different melting points and different deforming resistances or different hardness. For example, when an upper aluminum plate (melting point of 660° C.) and a lower palladium plate are to be welded, the lower palladium plate does not cause a plasticized material flow and the plates cannot be welded.

To solve the above problems, the welding method of this invention pushes a rotating welding tool against only one of members to be welded (without plunging the welding tool into the other member), causes a frictional heat between the welding tool and the member which is in contact with the welding tool, heats up the interface between the members by the frictional heat, causes materials of the members to diffuse, and welds the members together by the resulting reaction layer between them.

When different materials are lapped and welded, the welding tool must be plunged into the low melting-point member. For example, when an aluminum plate and a palladium plate are to be welded, the welding tool must be plunged into the aluminum plate (whose melting point is lower). In this case, it is assumed that materials diffuse from a low melting-point member to a high melting-point member. After performing the friction stir welding using the welding tool, the low melting-point member has a heat-affected zone, and the high melting-point member has substantially no heat-affected zone. Further, the welding tool in accordance with this invention has a pin section which is greater than a conventional one and the top of the pin section is protruded.

This welding tool enables welding (or welding) of thin membranes of different materials and specifically enables provision of a hydrogen supplying apparatus using a lamination of hydrogen separation membranes. A conventional welding tool is not available to thick members because it is hard for the tool to go into the member. Therefore, the conventional welding tool is limited to members of up to a predetermined thickness. However, the welding tool of this invention is also available to welding of thick members.

To achieve the welding method in accordance with the present invention, the welding tool must be equipped with at least a rotary shaft to rotate the welding tool, a tool moving shaft to press the welding tool against a member to be welded, and another tool moving shaft to move the tool along a welding line. In this case, it is possible to rotate the welding tool singly and to move the members towards the tool and along the welding line. The welding method of this invention can be implemented by for example, milling machines, NC milling machines, and other machine tools.

The rotational speed and moving speed of the welding tool depend upon the quality of materials and thicknesses of the members to be welded. For example, to lap and weld three aluminum plates of 0.2 mm thick together while plunging the welding tool into the upper plate only, the welding tool rotates at 18000 rpm and moves at 1800 mm/min. It is important to select a welding condition to control the thickness of a reaction layer (8), which is formed in the metallic interface between the members during binding. The welding method of this invention can suppress the thickness of the reaction layer below 5 μm.

This reaction layer is made of a brittle intermetallic compound and must be as thin as possible because it, if thick, reduces the fatigue strength of the reaction layer and causes breaks during welding. However, the reaction layer thinner than 0.1 μm is not fit for welding. The reaction layer of at least 0.1 μm thick is enough for strong welding of members.

This invention can provide a high-reliability members and apparatus since the reaction layer 8 is formed by diffusion-reaction of members and can be made thinner.

Since the welding method of this invention employs a local heating, the hydrogen supplying apparatus does not have any thermal damage on the catalyst during welding. This method can also prevent thermal growth of metallic particles in the catalyst. In other words, the initial metallic particle sizes can be retained. For example, when the catalyst initially contains metallic particles of up to 5 nm big, the particle sizes (5 nm or smaller) can be retained in the catalyst after the production of the hydrogen supplying apparatus.

Holders fit for shapes of members to be welded are used to hold members during welding. Specifically, to weld a lamination of membranes, it is recommended to hold the members in series along the weld line to prevent deformation of thin members by the pressing force of the welding tool.

The welding method of this invention can also weld members having catalyst-coated walls or poles on each hydrogen separation membrane by friction stir welding (FSW). As the result, the welded interface of the hydrogen separation membranes is rippled and the continuously welded parts and spot-welded parts form a pattern of channels through which hydrogen source material or hydrogen gas flows.

(Compounds Available to this Invention)

The substrate is made of high thermal-conductivity materials such as aluminum (Al) since the hydrogen generation by catalyst is an endothermal reaction. More specifically, such materials can be copper (Cu), nickel (Ni), aluminum (Al), titanium (Ti), zirconium (Zr), niobium (Nb), and alloys thereof. The substrate contains hydrogen source material channels, which are formed by machining or etching on the surfaces. The channel surfaces are covered with a catalyst layer so that hydrogen source material may be chemically reacted into hydrogen when hydrogen source material comes into contact with the catalyst while it passing through the channels.

The catalyst plate can carry metallic particles (as catalyst) on the metallic plate (substrate). In this case, the catalyst particles should preferably be up to 5 nm in size.

The catalyst of this invention should have a function to react hydrocarbons and other hydrogen source materials into hydrogen. The catalyst layer contains metallic catalysts and catalyst carriers. Metals (such as Ni, Pd, Pt, Rh, Ir, Re, Ru, Mo, W, V, Os, Cr, Co, and Fe) and alloys thereof are available as the metallic catalysts. The catalyst carriers can be selected from active carbon, carbon nanotubes, silica, alumina, alumina silicate (e.g. zeolite), zinc oxide, zirconium oxide, niobium oxide, and vanadium oxide.

Catalyst materials can be prepared by any method such as a co-precipitation method and a thermal cracking method. Catalyst layers can be formed by a solution process such as a sol-gel method or a dry process such as a CVD method. Further, when metals such as Al, Zr, Ni, and V or their alloys are used as catalyst materials, it is possible to anodize these metals into metal oxides and form the oxides as carriers directly on meal surfaces.

For the above metals, the anodizing method can use any electrolytic solution, for example, acid solution such as aqueous phosphoric, chromic, oxalic, or sulfuric solution, alkaline solution such as aqueous solution of sodium hydroxide or potassium oxide, or neutral solution such as aqueous solution of boric acid-sodium, ammonium tartarate, and ethylene glycol-ammonium borate.

The hydrogen separation membrane can be made of Pd, Nb, Zr, V, Ta or their alloys.

The hydrogen separation membrane should preferably be placed next to a catalyst layer to increase the efficiency in hydrogen separation and more preferably be unified with the catalyst layer. A hydrogen separation membrane unified with a catalyst layer can be prepared by forming a catalyst layer on a hydrogen separation membrane or giving a catalyst function to the hydrogen separation membrane.

Specifically, the catalyst-unified hydrogen separation membrane can be prepared by lap-welding (welding) a metal foil (e.g., Zr, Ni, V or alloys) and a hydrogen separation metal foil which mainly contains these metals, anodizing the metal foil (e.g., Zr, Ni, or V), and producing metal oxide (as a catalyst carrier) on the surface of the metal foil.

Further, it is possible to use, as a raw material of the catalyst-unified hydrogen separation membrane, a clad material, which is prepared, for example, by forming a Nb layer on the surface of a Ni—Zr—Nb alloy membrane as a core material. The Ni—Zr—Nb alloy is more resistant than a Zr. Nb or alloys membrane to embrittlement by hydrogen and has an excellent hydrogen transmitting permeation function. Then, the clad material is anodized to turn the Nb layer on the surface into a niobium oxide layer, the niobium being completely turned into niobium oxide, and platinum (Pt) is doped to the niobium oxide layer. By this method, the catalyst-unified hydrogen separation membrane is obtained.

Instead of the Ni—Zr—Nb alloy membrane, the core material can use a palladium-based alloy membrane which is made of Pd, Pd—Ag, Pd—Y, Pd—Y—Ag, Pd—Au, Pd—Cu, Pd—B, Pd—Ni, Pd—Ru, or Pd—Ce, or a non-palladium-based alloy membrane which is made of Ni—Zr, Ni—Nb, Ni—Zr—Nb, Ni—V or Ni—Ta. These hydrogen separation membranes can be prepared by a rolling process, solution process, vacuum-deposition process, sputtering process, or plating process (such as electroless plating or electroplating.

The metal (Nb) in the metallic layer on the surface of the core surface can be replaced by anodizable metals such as Al, Nb, Ta, Zr, Zn, Ti, Y, and Mg. The metallic layer can be formed on the surface of the core surface by welding, compressing, vacuum-deposition, or sputtering.

The hydrogen storage materials (or hydrogen source materials) of this invention can be one or more aromatic compounds selected from a group consisting of benzene, toluene, xylene, mesitylene, naphthalene, methylnaphthalene, anthracene, biphenyl, phenanthrene, and alkyl substituents thereof, aqueous ammonia, aqueous hydrazine solution, sodium borate, or oxygen-hydrogen storage material which is a mixture of hydrogen peroxide solution and aqueous ammonia or aqueous hydrazine solution.

Embodiment 1

(FSW)

Figure 2A:
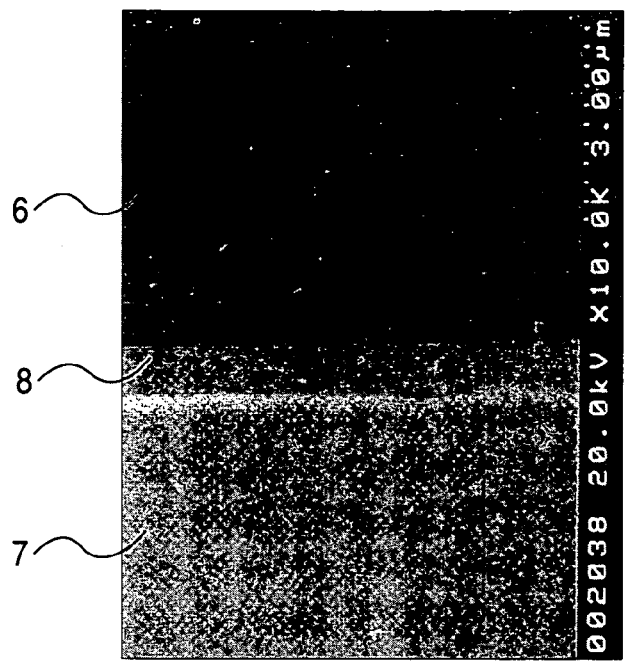
FIG. 2(a) shows a sectional view of an interface of the welded members in a first embodiment.
Figure 2B:
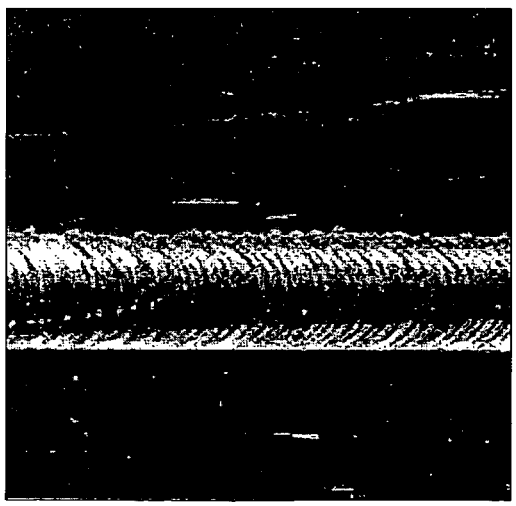
FIG. 2(b) shows a top view of the welded member.
Figure 2C:
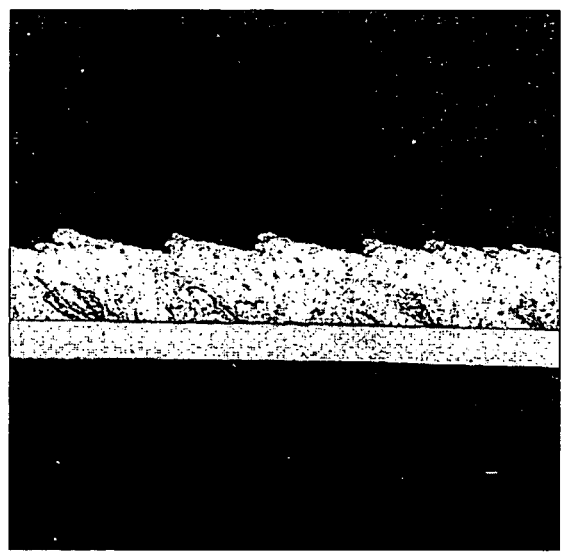
FIG. 2(c) shows an entire sectional view of the welded members.

FIG. 2 shows pictures of the welded members of an embodiment of this invention. FIG. 2(*a*) shows the sectional view of the interface of the welded members. FIG. 2(*b*) shows the top view of the welded members and FIG. 2(*c*) shows the entire sectional view. Reaction layer 8 of up to about 1 μm thick is produced in an interface between upper plate 6 and lower plate 7 thereby to bond these plates 6 and 7. Ripples are recognized along the weld line when viewed from the top surface into which the welding tool is plunged. In FIG. 2(*c*), the welding tool moves to the left.

Figure 3:
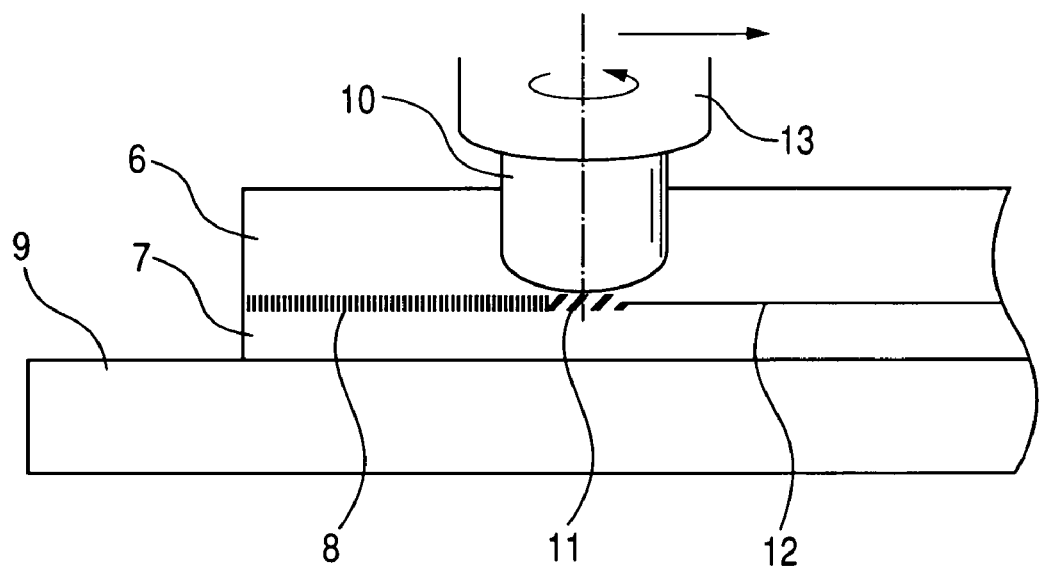
FIG. 3 shows a sectional view of members which are being welded in the first embodiment.

Below will be explained the welding process in detail. FIG. 3 shows the sectional view of members, which are being welded. Upper plate 6 of 0.2 mm thick is made of pure aluminum (JIS A1050-O) and lower plate 7 of 0.1 mm thick is made of a Pd—Ag alloy. Welding tool 10 is made of tool steel and a pin of 4 mm in diameter, which is smaller than that of a shoulder 13. The tip of the welding tool is rounded to have a curvature radius of 5 mm. The welding tool 10 is rotated at a speed of 18000 rpm and moved down at a speed of 300 mm/min to plunge into upper plate 6. In this case, the welding tool plunges into upper plate 6 only and does not reach lower plate 7. This plunging force makes the lower surface of upper plate 6 in close contact with the upper surface of lower plate 7 at interface 11. The welding tool 10 is moved along the weld line at a speed of 300 mm/min while rotating the tool at a speed of 18000 rpm. At the end of welding, the tool (10) is moved up at a speed of 120 mm/min. In the above welding process, frictional heat generates in the interface 12 between the tool (10) and the upper plate (6) and increases the temperature of the interface (11). Metals between upper and lower plates (6 and 7) become soft and diffuse into the plate materials. As the result, reaction layer 8 is produced between the upper and lower plates (6 and 7) and metallically bonds the upper and lower plates together. The reaction layer (8) produced under this welding condition is 1 µm thick.

The thickness of the reaction layer (8) depends upon the rotational speed, plunging speed, and traveling speed of the welding tool (10). The reaction layer (8) becomes substantially thicker as the rotational speed is greater, the plunging pressure is greater, and the traveling speed is lower. The reaction layer (8) is a brittle intermetallic compound. It should preferably be as thin as possible because it, if thick, reduces the fatigue strength of the reaction layer. However, plates cannot be welded without this reaction layer (8). Therefore, it is important to select a welding condition to control the thickness of the reaction layer (8).

The welding method of this invention can weld members by local heating only. So catalysts of the hydrogen supplying apparatus of this invention cannot be seriously damaged by heat. This method can also prevent thermal growth of metallic particles in the catalyst. In other words, the initial metallic particle sizes can be retained. This embodiment uses catalyst which contains metallic particles of up to 5 nm big and the welded catalyst in the hydrogen supplying apparatus also contains metallic particles of up to 5 nm big. In other words, thermal growth of particles can be prevented.

COMPARATIVE EXAMPLE

A sample was prepared by making the surface of a pure aluminum plate (JIS A 1050-O) wavy, coating the dent areas with $Al_2O_3$ catalyst powder which contains 5 wt % of Pt (Pt particles of 3 nm in size) to make a catalyst plate, placing a Pd—Ag alloy foil on the catalyst plate, and keeping the catalyst plate covered with the alloy foil in a vacuum hot press at 580° C. for 5 hours to weld thereof. This sample was cut and undergone a tensile strength test. The sample was broken in the interface between the AL plate and the Pd—Ag alloy foil. The measured size of Pt particles in the catalyst is 10 nm in diameter (by the X-ray diffraction method). Judging from this, the high-pressure high-temperature welding is not enough for practical welding strength and further causes growth of Pt particles from 3 nm to 10 nm because of long-term exposure to heat. This leads to the deterioration of the welded members.

Embodiment 2

Below will be explained a hydrogen supplying reactor which is a second embodiment of this invention.

Figure 4:
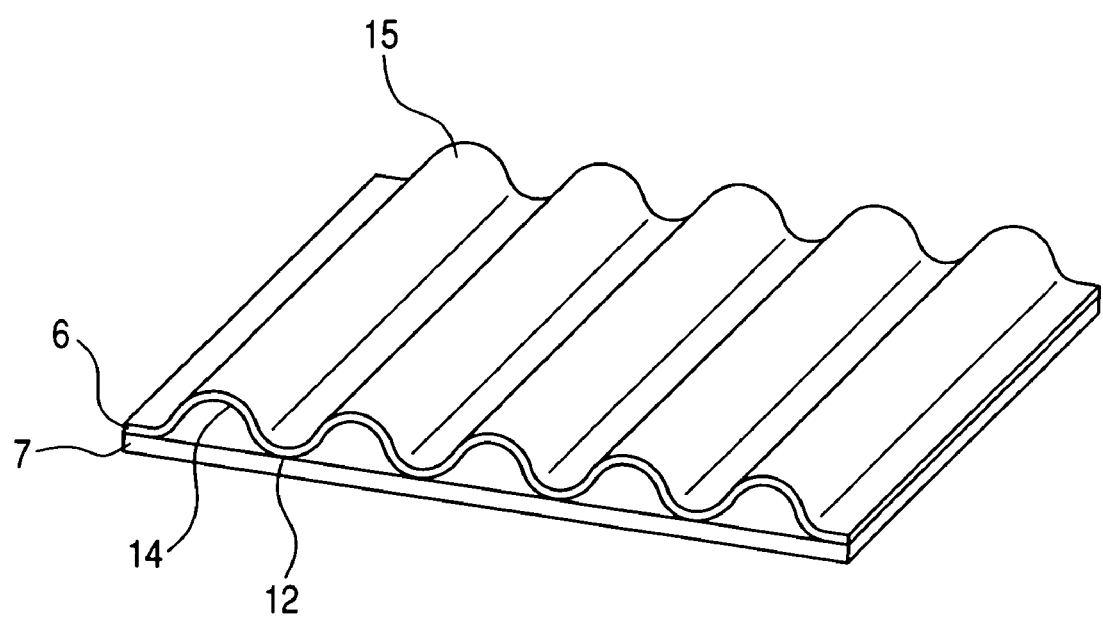
FIG. 4 shows an external perspective view of a hydrogen supplying reactor in the second embodiment of this invention.
Figure 5A:
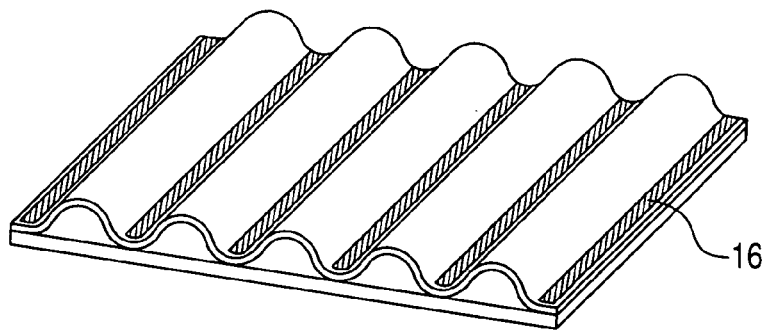
FIG. 5(a) shows an external view of a motion-welded hydrogen supplying reactor.

FIG. 4 shows the external view of another hydrogen supplying reactor of this invention. FIG. 5 shows the external views of welded hydrogen supplying reactors. Both upper and lower plates (6 and 7) are made of aluminum and respectively 0.2 mm (upper plate) thick and 0.1 mm thick (lower plate). Catalyst plate 15 is prepared by coating one surface (lower surface) of upper plate with a catalyst layer 14 and making this catalyst-coated upper plate wavy or pleated as shown in FIG. 4.

The wavy or pleated catalyst plate (15) is placed on the lower plate (7). The spaces between the lower plate (7) and the catalyst plate (15) whose lower surface is coated with a catalyst layer work as channels to flow hydrogen source material These plates (7 and 15) are welded along weld lines 16 under the same welding condition as that for Embodiment 1. The resulting hydrogen supplying reactors can be deformed and accumulated into a hydrogen supplying stack.

Figure 5B:
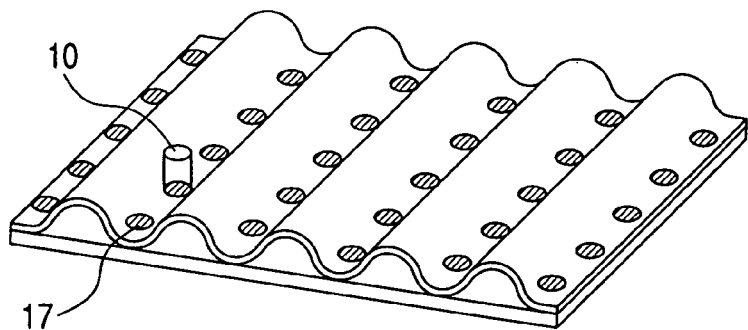
FIG. 5(b) shows an external view of a spot-welded hydrogen supplying reactor.

As shown in FIG. 5(b), it is also possible to spot-weld the catalyst plate (15) by applying a pressing force to the upper surface of the catalyst plate for a preset time period without moving the welding tool (10). In other words, spot-welding 17 is implemented intermittently along the weld line.

Embodiment 3

(Stacking)

The friction stir welding (FSW) method is required to plunge the welding tool into a material of a lower melting-point when welding members of different materials. Therefore, the FSW method is not available to conventional structures comprising substrates and hydrogen separation membranes.

FIG. 6 shows an example of a hydrogen supplying apparatus which comprises a Pd—Ag hydrogen separation membrane, a catalyst plate made of an Al substrate, and a spacer.

The inventors shifted the weld position 18(a) between the catalyst plate and the hydrogen separation membrane from the weld position 18(b) between the spacer and the hydrogen separation membrane as shown in FIG. 6. Any of the weld positions 18(a) and 18(b) can be placed outwards (or inwards) as long as the weld positions are different.

Figure 7:
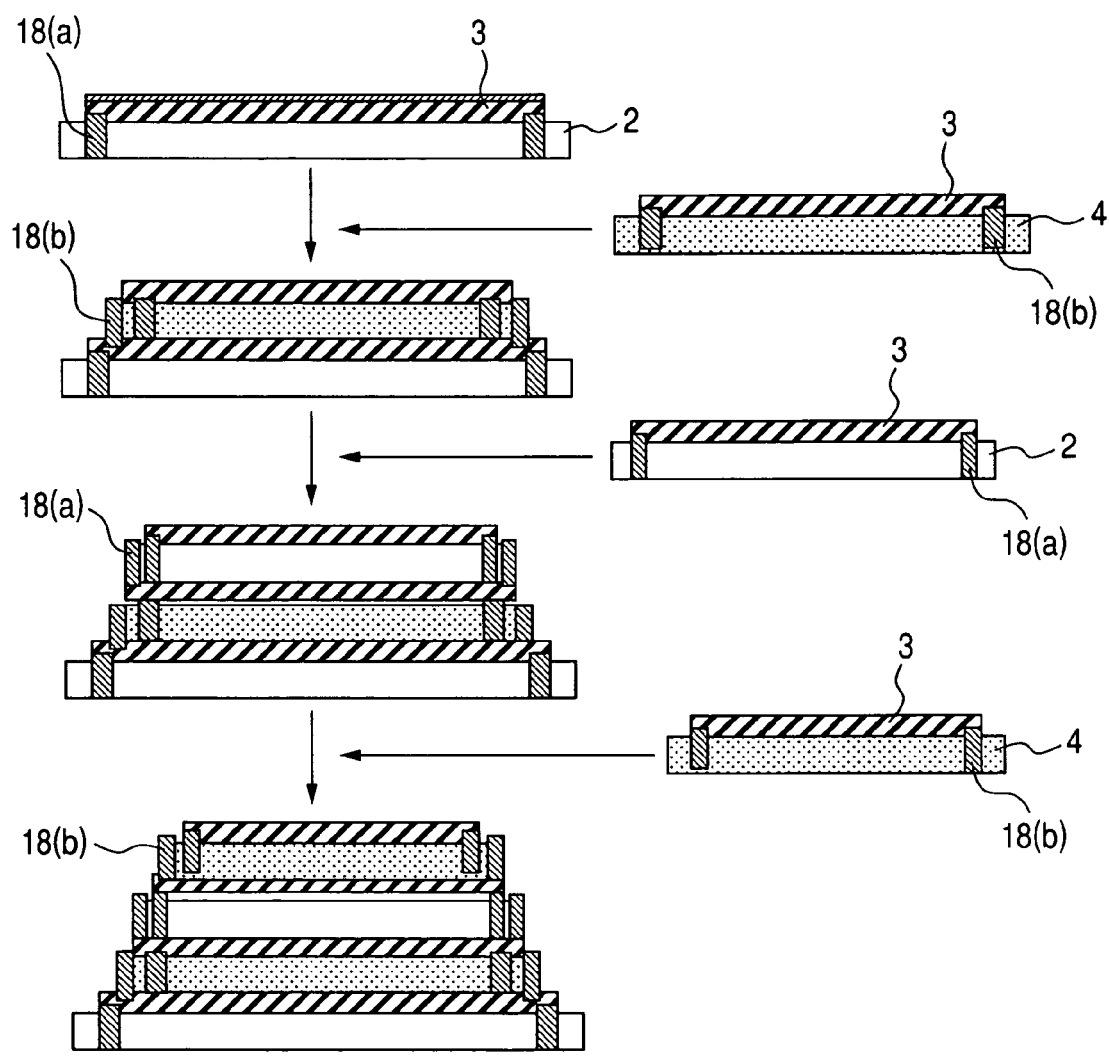
FIG. 7 shows a flow of stacking hydrogen supplying reactors in accordance with this invention.

FIG. 7 shows an example of stacking the hydrogen supplying apparatus of FIG. 6. Since the friction stir welding must be implemented first on the Al substrate as shown in FIG. 6, the hydrogen separation membranes must change their sizes as they are stacked. In other words, the hydrogen separation membrane over the Al substrate is bigger (or smaller) than the hydrogen separation membrane under the Al substrate.

Catalyst plate 2 and hydrogen separation membrane 3 are welded at weld position 18(a) while the spacer and the hydrogen separation membrane are welded at weld position 18(b). These welded assemblies are lapped and welded at the weld position 18(b). Similarly, another assembly of catalyst plate 2 and hydrogen separation membrane 3 which are welded at weld position 18(a) is placed on the above stacked member and welded together at weld position 18(a). These steps are repeated to produce a target hydrogen supplying stack. As shown from the drawings, the upper stack component of a substrate and a hydrogen separation membrane is smaller than the lower stack component so that their weld positions may be shifted.

Figure 8:
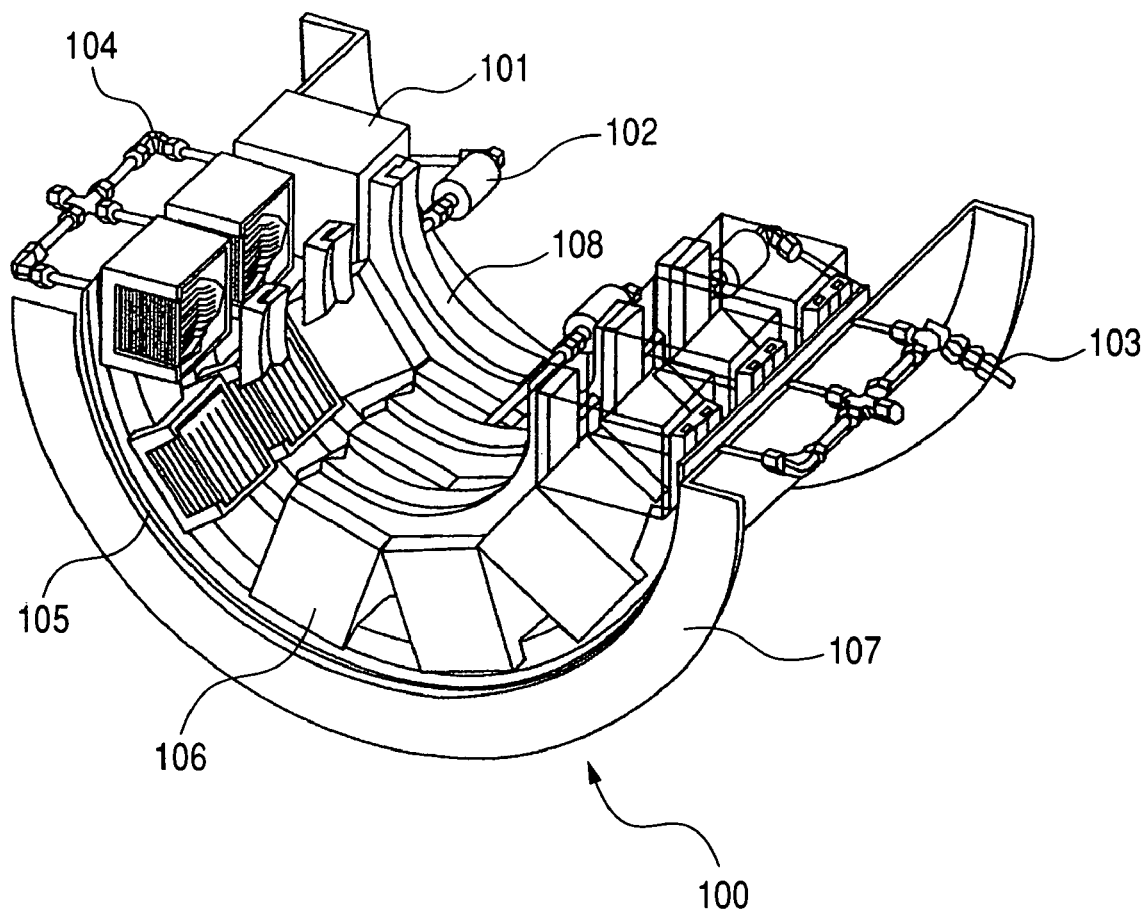
FIG. 8 shows a partial-sectional view of a hydrogen supplying module, which is one embodiment of this invention.

FIG. 8 shows an example of hydrogen supplying module, which arranges the welded members of FIG. 6 on the inner wall of a cylindrical part (or a tube). Hydrogen supplying module 100 provides heat-insulator 105 and hydrogen supplying stacks 101 on the inner wall of pipe 107. Hydrogen supplying stack 101 receives hydrogen source material vapor (organic hydride) from carburetor 102, dehydrogenates it into hydrogen and waste liquid. Hydrogen is separated by the hydrogen separation membrane in hydrogen supplying stack 101 and fed to an engine or a fuel cell through hydrogen supply port 104. The waste liquid is discharged from hydrogen supplying stack 101 and sent to a waste tank through manifold 108 and waste port 103.

Since hydrogen separation membranes must be smaller as they are stacked (as already explained but not shown in the drawing), the cross-section of the accumulated members in the hydrogen supplying stack 101 is trapezoidal. Therefore, the members can be densely assembled in the tube. Further, when hot exhaust gas is guided into the tube, waste heat can be used for hydrogen supply.

Embodiment 4

(Friction Stir Welding (FSW) Method, Tool Shapes, and Member Shapes in the Invention)

Other welding items such as reactor-pipe coupling and pipe-pipe coupling have problems to be solved.

Pipes are used as structures to supply liquid or gaseous materials. Some liquid or gaseous materials may corrode the inner wall of the pipes and reduce the natural properties of materials.

A general rotary tool for the friction stir welding (FSW) method is a shouldered tool with a pin 10, which is smaller in diameter than the shoulder 13. For friction stir welding, it is necessary to plunge the entire pin and part of the shoulder into a welded material (under the surface of the material) and move the tool along the weld line. In this case, the welded material must be supported by a backing metal or the like since an excessive load is applied to the back surface of the welded material (opposite to the surface from which the tool is plunged).

This backing material can prevent deformation of the back surface of the welded material and assure non-defective welding. However, when the friction stir welding is applied to weld pipe circumferences, or specifically when the rotary welding tool is inserted into a pipe from the outside, it is hard to provide a backing material in the pipe. In this case, a force is required to push against the insertion of the rotary welding tool (or a force toward the outside of the tube). Particularly, it is very hard to accomplish this when small-diameter pipes are welded.

Below will be explained a welding method fit for welding small-diameter pipes. The welding method of this embodiment is characterized by friction-stirring the inner walls of cylindrical members to be welded, softening the inner surface layers of the pipes by frictional heat (to cause a plasticized material flow), and thus welding the pipes.

The welding method of this invention is characterized in that, when members having cylindrical inner walls are welded, a protrusion which is protruded inward (to the center axis) is provided on the cylindrical inner wall of each welded member and that the protrusion is accompanied by a groove which is recessed below the cylindrical inner wall.

When the welding tool of this invention is inserted into cylindrical inside of welded members of this structure and friction-stirred there, part or all of the protrusions are plasticized by frictional heat and fill the recessed groove. As the result, the welded members are fully welded without any protrusions and dents on the cylindrical inner walls. At the same time, it is expected that the metallic welded part is resistant to hydrogen embrittlement.

Generally, pipes are used as structures to supply liquid or gaseous materials. Some liquid or gaseous materials may corrode the inner wall of the pipes and reduce the natural properties of materials.

One of factors for hydrogen embrittlement is said that, hydrogen which is stored when a welding stress is made gathers in grain boundaries and propagates cracks from there. One of possible methods to suppress the hydrogen embrittlement is to make material crystals smaller, make crack propagation paths complicated, and suppress beaks of grain boundaries.

It is preferable to make crystal boundaries smaller. In normal fusion-welding, crystal grow in the direction that the molten tissues are solidified. So cracks are apt to propagate from grain boundaries. Contrarily, the friction stir welding does not melt the welded part and leaves crystal grains not grown. It is expected that the sensibility to hydrogen embrittlement is reduced. Therefore, this invention can expect reduction of sensibility of welded metals to hydrogen embrittlement.

Hereinafter, the above preferred embodiment of this invention will be described specifically with reference to the accompanying drawings.

Figure 9:
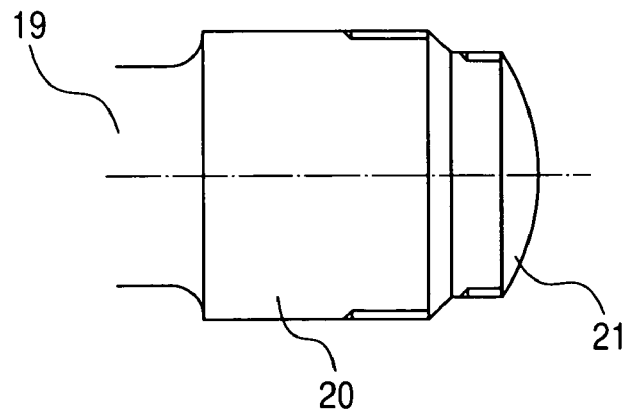
FIG. 9 is a sectional view of the rotary welding tool in the fourth embodiment.

FIG. 9 is a sectional view of the welding tool in the fifth embodiment. Welding tool 19 contains shoulder 20 which has the maximum diameter and pin 21 which is provided on the forefront of the shoulder and smaller in diameter than shoulder 20. The shoulder side is screw-threaded to increase generation of frictional heat between the shoulder and the cylindrical inner walls of pipes and the plasticized material flow to a specified direction.

Figure 10:
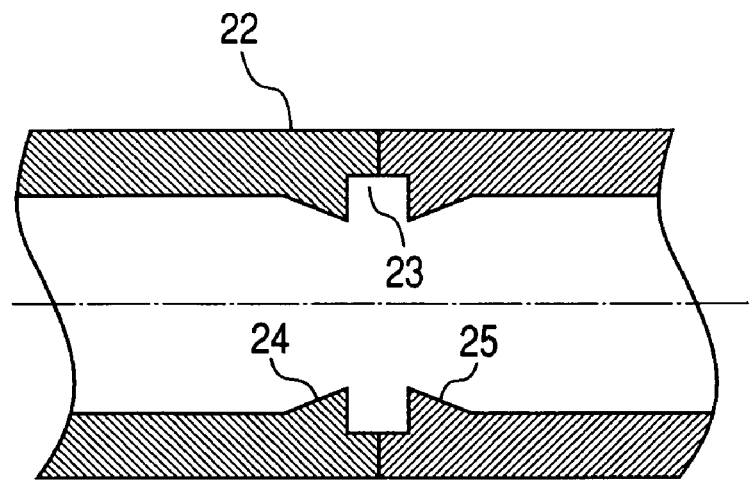
FIG. 10 is a sectional view of the joint of a welded area of pipes used in the fourth embodiment.

FIG. 10 is a sectional view of the joint area of pipes used by this embodiment. In pipe joint 22, groove 23 is formed on the inner wall of each pipe to be jointed. Protrusion 24 (25), which is smaller in diameter than the groove (23) is provided next to the groove (23) on the inner wall of each pipe.

Next will be explained how the welding process of this embodiment is carried out.

Figure 11:
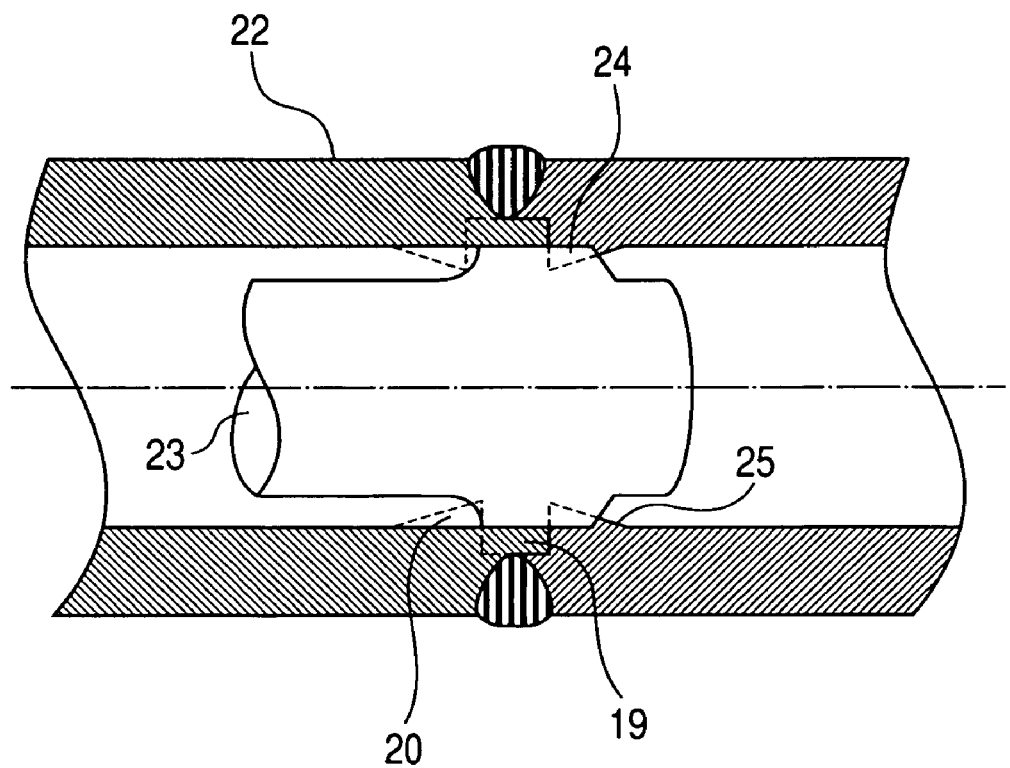
FIG. 11 is a sectional view of the joint of the welded pipes in the fourth embodiment.

FIG. 11 is a sectional view of the joint area of pipes on which welding is in progress. The pipe to be welded is made of pure aluminum (JIS A 1050-O) and 6 mm in outer diameter and 4 mm in inner diameter. The protrusion on the cylindrical inner wall is 1 mm thick. The shoulder (20) of the welding too (19) is 4 mm in outer diameter. The pin (21) is 3 mm in diameter.

First, the joint (22) is welded from the outer side to the circumference. Any welding method can be used: fusion-welding such as TIG welding or friction stir welding (FSW). Next, the welding tool (19) is rotated at a speed of 1500 rpm and inserted into the pipe. Then, the rotating tool (19) is further inserted at a speed of 100 mm/min until it passes by the protrusion (24) and then the protrusion (25). The rotating tool is drawn back at a speed of 100 mm/min until it goes out of the pipe. With this, welding is completed. During welding, part of the protrusion (24) is softened and plasticized by the frictional heat by the tool (19) and moved to fill the groove 23 by the rotation and movement of the tool (19). In this case, the protrusion (25) has an effect to prevent the plasticized material of protrusion 24 from flowing to the forefront of the tool (19) over the groove (23). The protrusion (24) does not work to fill the groove (23). The cylindrical inner wall and the groove (23) are fully compressed by the rotating side of the shoulder 20. This can form a welding layer (caused by FSW) on the inner surface of the pipes.

Embodiment 5

Figure 12:
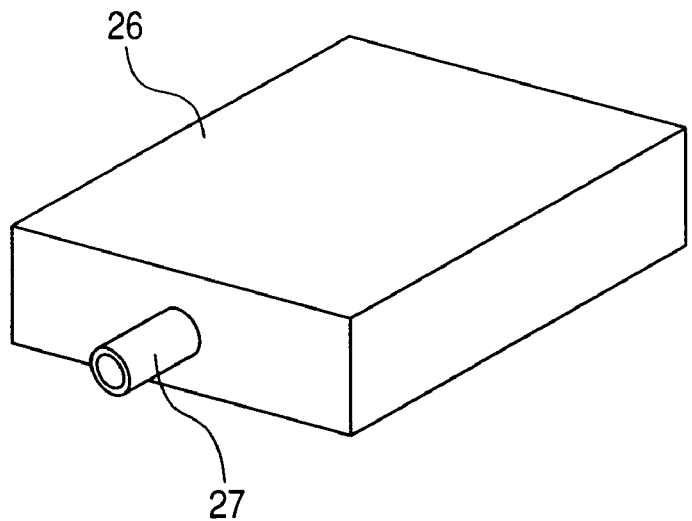
FIG. 12 shows an external view of a hydrogen supplying apparatus.

FIG. 12 shows an external view of a hydrogen supplying apparatus which is a sixth embodiment of this invention.

Hydrogen supplying apparatus 26 contains an internal structure, which accumulates multiple hydrogen supplying reactors. Pipe 27 is connected to the hydrogen supplying apparatus (26).

Each reactor has its four sides continuously welded by the welding method of embodiment 1. Two or more reactors are stacked and the sides of the hydrogen supplying stack is welded by a laser welding, fusion-welding (e.g., TIG welding) or friction stir welding (FSW). A through-hole is drilled on the lateral side of the reactor stack to flow hydrogen and pipe 27 is connected to this through-hole.

Figure 13:
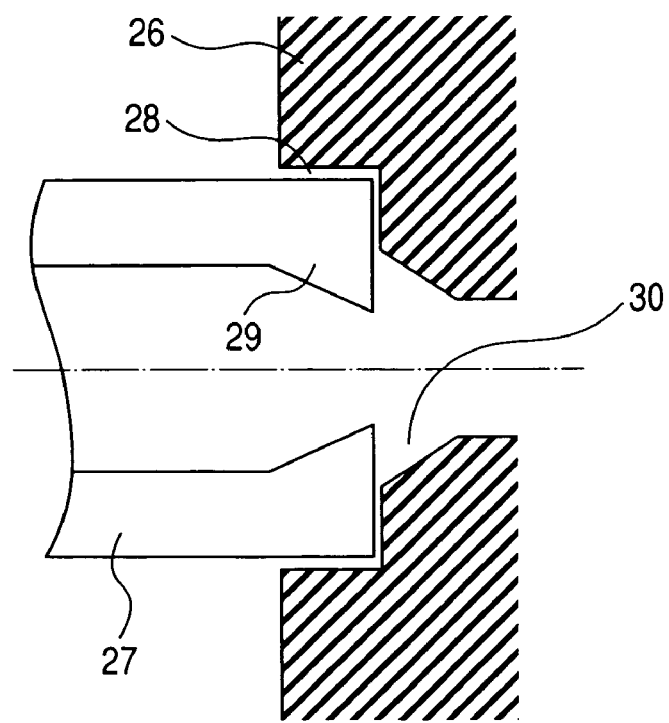
FIG. 13 is a sectional view of a joint of the welded pipes in the sixth embodiment.

FIG. 13 is a sectional view of a joint of the pipe with the through-hole 28 on the lateral side of hydrogen supplying apparatus 26. The joint area of through-hole 28 on the lateral side of hydrogen supplying apparatus 26 has a recessed circular area whose diameter is greater than the outer diameter of pipe 27 and a recessed circular area whose diameter is equal to the inner diameter of pipe 27. Pipe 27 is fit into this recessed area. The outer end of pipe 27 is equipped with protrusion 29 so that groove 30 may be formed between the pipe and the inlet part of the through-hole when the pipe (27) is connected to the through-hole.

Below will be explained how the pipe is welded to the through-hole of the hydrogen supplying reactor.

Figure 14:
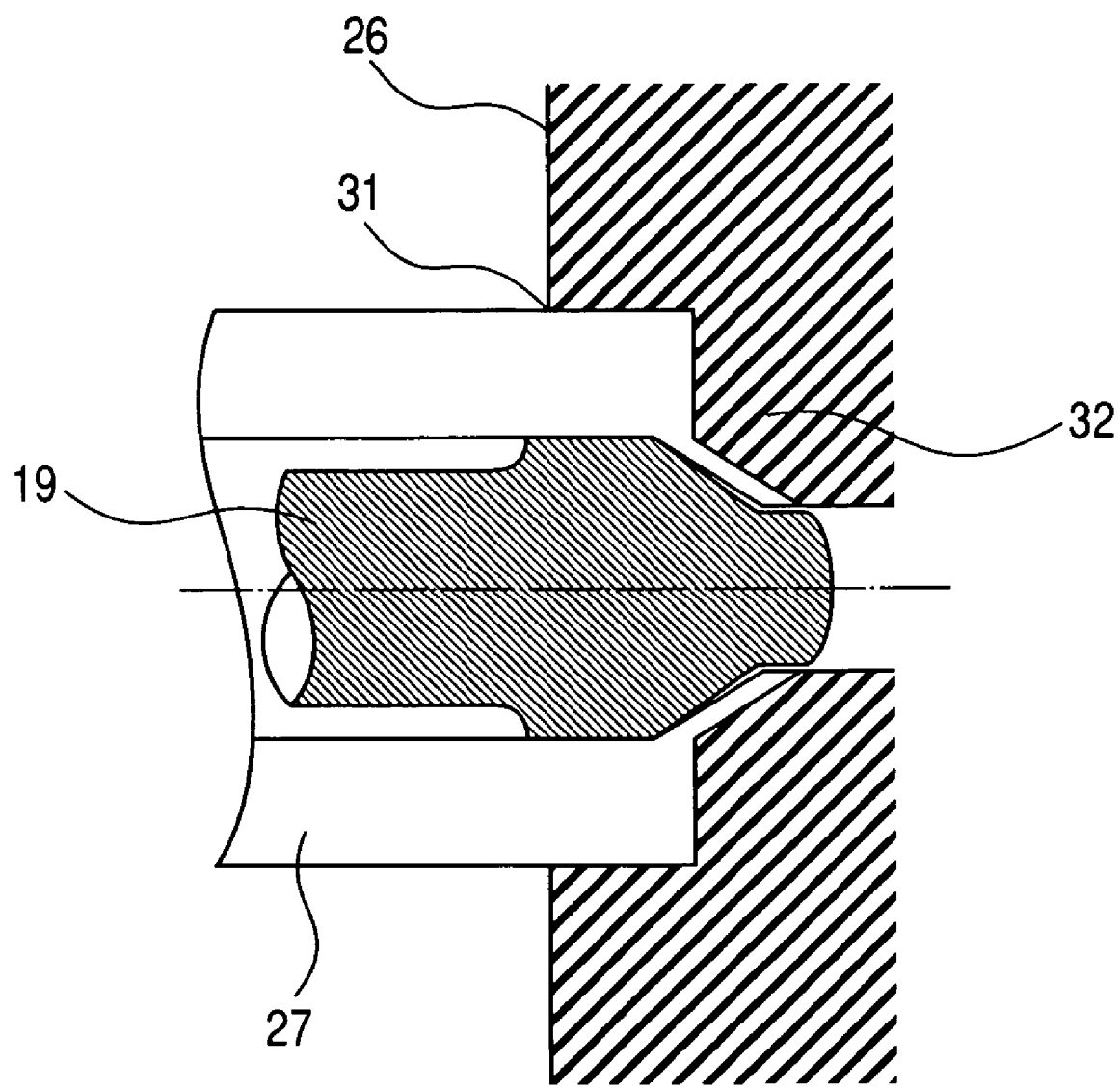
FIG. 14 is a sectional view of the joint in the sixth embodiment.

FIG. 14 is a sectional view of the joint area on which welding is in progress. First, pipe 27 is fit to the recessed area of through-hole 28 on the lateral side of hydrogen supplying apparatus 26. Joint 31 at which the outer surface of pipe 27 is in contact with the recessed part of the lateral side of hydrogen supplying apparatus 26 is welded by laser.

Next, the welding tool (19) is rotated at a speed of 1500 rpm and inserted into the pipe (27) at a speed of 100 mm/min towards the hydrogen supplying apparatus (26). When the tool (19) touches the protrusion 29, the protrusion becomes soft (or loses the deformation resistance) by frictional heat and plasticized to flow. When the tool goes further, the plasticized protrusion metal is pushed into the groove (30) to fill thereof. Before the shoulder (20) reaches the hydrogen supplying apparatus, the tool (19) is drawn back and welding is completed. In the above welding process, frictional heat generates in the place at which the plasticized protrusion metal (29) is in contact with the groove (30) and increases the temperature of the joint interface 32. As the molten interface metals start to diffuse and weld the members.

What is claimed is:

1. A hydrogen supplying apparatus comprising a reactor, which comprises a hydrogen separation membrane that permeates hydrogen atoms, supported on a first metallic member and a catalyst supported on a second metallic member, wherein the first metallic member and the hydrogen separation membrane are bonded by means of a first reaction layer formed in the interface of the first metallic member and the hydrogen separation membrane, and the hydrogen separation membrane and the second metallic member are bonded by means of a second reaction layer formed in the interface of the hydrogen separation membrane and the second metallic member, wherein the second metallic member and the hydrogen separation membrane are bonded by friction stir welding, wherein the first metallic member and the hydrogen separation membrane are bonded by friction stir welding, and wherein a weld position between the second metallic member and the hydrogen separation membrane is shifted in a direction along the interface of the first metallic member and the second metallic member, with respect to a weld position between the first metallic member and the hydrogen separation membrane.

2. The hydrogen supplying apparatus according to claim 1, wherein one of the first and second metallic members, having a lower melting point than that of the other of the first and second metallic members, has a heat-affected zone, while the other of the first and second metallic members has substantially no heat-affected zone.

3. The hydrogen supplying apparatus according to claim 1, which comprises a stack of reactors each comprising multiple sets of a metal plate with a catalyst layer, the metal plate being the second metallic member, the hydrogen separation membrane, and a spacer.

4. The hydrogen supplying apparatus according to claim 3, wherein the metal plate and the hydrogen separation membrane have rippled surfaces and are made of different materials with different hardness.

5. The hydrogen supplying apparatus according to claim 1, which comprises multiple hydrogen separation membranes each of which is adjacent the catalyst, wherein the catalyst is sandwiched between the hydrogen separation membranes.

6. The hydrogen supplying apparatus of claim 5, wherein the hydrogen separation membrane is sandwiched between the catalyst plates and wherein the hydrogen separation membrane on one face of the catalyst plate is different in size from that on the other face of the catalyst plate.

7. The hydrogen supplying apparatus of claim 3, wherein the metal plate has grooves through which hydrogen source material or hydrogen gas passes, the grooves being determined by the welded portion.

8. The hydrogen supplying apparatus of claim 1, wherein the hydrogen separation membrane is a metal foil made of Pd, Nb, Zr, Ta or their alloys.

9. The hydrogen supplying apparatus according to claim 1, wherein the first metallic member has a spacer.

10. The hydrogen supplying apparatus according to claim 1, wherein the hydrogen separation membrane is bonded to both the first metallic member and the second metallic member by the friction stir welding.

11. The hydrogen supplying apparatus according to claim 10, wherein the first metallic member and the hydrogen separation membrane are bonded by means of a reaction layer formed in the interface therebetween, and the second metallic member and the hydrogen separation membrane are bonded by means of a reaction layer formed in the interface therebetween.

12. The hydrogen supplying apparatus according to claim 10, wherein the second metallic member is made of a different material with a different melting point than that of the hydrogen separation membrane.

13. The hydrogen supplying apparatus according to claim 1, wherein said reaction layer has a thickness of at least 0.1 μm.

14. The hydrogen supplying apparatus according to claim 1, wherein the first and second metallic members have different melting points from each other.

15. The hydrogen supplying apparatus according to claim 1, wherein said hydrogen separation membrane that permeates hydrogen atoms, supported on said first metallic member, is stacked on said catalyst supported on said second metallic member.

16. The hydrogen supplying apparatus according to claim 1, wherein the first metallic member, supporting the hydrogen separation membrane, is a spacer member, and there is an additional hydrogen separation member between the spacer member and the catalyst supported on the second metallic member.

* * * * *